United States Patent [19]

Lemme et al.

[11] Patent Number: 5,638,607
[45] Date of Patent: Jun. 17, 1997

[54] COFFEE ROASTER

[75] Inventors: Anthony R. Lemme, Wallingford; Chester Fudge, Middletown, both of Conn.

[73] Assignee: Source Intermarketing AG, Switzerland

[21] Appl. No.: 555,224

[22] Filed: Nov. 8, 1995

[51] Int. Cl.⁶ .................................................. F26B 11/02
[52] U.S. Cl. .............................. 34/136; 34/135; 219/385; 392/379; 99/323.4
[58] Field of Search .......................... 34/135, 136, 137, 34/140, 599; 99/323.4, 323.5, 348; 219/385, 389, 521; 392/382, 383, 379

[56] References Cited

U.S. PATENT DOCUMENTS

| | | | |
|---|---|---|---|
| D. 87,997 | 10/1932 | Kelly . | |
| D. 94,535 | 2/1935 | Bly et al. . | |
| 366,106 | 7/1887 | Hungerford | 34/140 |
| 1,629,943 | 5/1927 | Zeun | 219/389 |
| 2,168,797 | 8/1939 | Havis | 219/389 |
| 4,271,603 | 6/1981 | Moore, III | 34/181 |
| 4,325,191 | 4/1982 | Kumagai et al. | 34/54 |
| 4,494,314 | 1/1985 | Gell, Jr. | 34/10 |
| 4,642,906 | 2/1987 | Kaatze et al. | 34/13 |
| 4,683,666 | 8/1987 | Igusa et al. | 34/67 |
| 4,691,447 | 9/1987 | Nakai et al. | 34/4 |
| 4,860,461 | 8/1989 | Tamaki et al. | 34/68 |
| 4,871,901 | 10/1989 | Igusa et al. | 219/400 |
| 5,182,981 | 2/1993 | Wilcox | 99/333 |
| 5,269,072 | 12/1993 | Waligorski | 34/57 |
| 5,287,633 | 2/1994 | Sachs | 34/13 |
| 5,359,788 | 11/1994 | Gell, Jr. | 34/360 |

*Primary Examiner*—John M. Sollecito
*Assistant Examiner*—Dinnatia Doster
*Attorney, Agent, or Firm*—DeLio & Peterson LLC

[57] ABSTRACT

A roasting apparatus for coffee beans and other food includes a removable drum on the housing rotatable about a horizontal axis and drive means on the housing for supporting and rotating the drum. The drum has a plurality of internal vanes arranged such that i) as the drum is rotated in one direction the beans are stirred and retained by the vanes within the drum, and ii) as the drum is rotated in the opposite direction the beans are moved by the vanes toward the drum opening for dispensing from the roasting apparatus. A removable cover includes a safety interlock which, when activated, prevents opening of the cover when the drum is at bean roasting temperature and which automatically deactivates upon cooling of the drum to permit opening of the cover to remove the drum. A chaff collector has an opening for alignment with the drum opening and a lip which is captured by the cover when the cover is in the closed position, and is non-removable from the roasting apparatus housing when the cover is in the closed position. The chaff collector includes a baffle for deflecting chaff into the chaff collection portion while permitting dispensing of the beans out of the roasting apparatus.

20 Claims, 9 Drawing Sheets

COFFEE ROASTER

BACKGROUND OF THE INVENTION

1. Field of the Invention

This invention relates to an apparatus and method for roasting coffee and other beans and nuts and, in particular, to an apparatus which may be used in the home.

2. Description of Related Art

Numerous devices are known for roasting coffee beans. Several of these devices having included rotating drums such as those disclosed in U.S. Pat. Nos. 5,287,633, 2,168,797, 4,691,477, 4,860,461, 4,871,901 and 4,683,366. However, none of these devices incorporate a drum for holding the green coffee beans during roasting which is easy to load, unload and clean. For such an appliance to be useful in the home, it must incorporate efficiently designed and constructed components which make it easy to use and clean. In doing so, safety is also an issue since the beans must be roasted at temperatures generally in excess of about 350° F. (175° C.), and the user must be prevented from contact with the heated portions of the device when they are still hot.

Problems also occur in dispensing the coffee beans after roasting, including the problem of the chaff which is generated by flaking of the roasted outer coating of the bean upon movement and contact with the other beans. Chaff has an unpleasant taste and, even if present in only a minor amount, serves to diminish the flavor of the coffee produced from the roasted bean. U.S. Pat. No. 5,269,072 discloses one solution to the chaff problem. However, in this patent the chaff collector must be removed from the device in order to gain access to the drum containing the roasted beans. In the act of removing the chaff collector, such chaff can be stirred up and deposited back onto the beans or around the general area where the coffee is being roasted. It would be desirable to have a coffee roaster in which the chaff collector can efficiently perform its function without interfering with the process of dispensing the roasted coffee beans.

Bearing in mind the problems and deficiencies of the prior art, it is therefore an object of the present invention to provide an improved roasting apparatus for coffee and other food items for use in the home and small commercial establishments.

It is another object of the present invention to provide a roasting apparatus which may be easily cleaned.

It is a further object of the present invention to provide a roasting apparatus which prevents the user from accessing excessively hot portions of the device.

It is yet another object of the present invention to provide a roasting apparatus in which the coffee beans or other food items may be easily loaded, roasted and dispensed.

It is yet another object of the present invention to provide a coffee roaster with a chaff collector which does not interfere with dispensing of the roasted coffee beans and prevents chaff from escaping the device.

SUMMARY OF THE INVENTION

The above and other objects and advantages, which will be apparent to those skilled in the art, are achieved in the present invention which is directed to, in a first aspect, a roasting apparatus for coffee beans and other food comprising a housing, a heater on the housing capable of heating the beans to a temperature sufficient to roast the beans, and a drum on the housing rotatable about an axis and having an opening therein for receiving beans to be roasted, retaining the beans as the beans are heated and dispensing the beans at the completion of roasting. Within the drum there is provided a plurality of vanes for imparting movement to the beans as the drum is rotated. The vanes are arranged such that i) as the drum is rotated in one direction about the axis the beans are stirred and retained by the vanes within the drum, and ii) as the drum is rotated in the opposite direction about the axis the beans are moved by the vanes toward the drum opening for dispensing from the roasting apparatus.

In a related aspect, the present invention also provides a method of roasting coffee beans and other food comprising the steps of initially providing a roasting apparatus for coffee beans and other food of the type described above. Initially, the user loads beans into the drum and heats the beans while rotating the drum in a first direction until the beans are roasted to a desired degree. Thereupon, the user discontinues rotation of the drum in the first direction and commences rotating the drum in a second direction, opposite to the first direction, to eject the roasted beans from the roasting apparatus. Preferably, the roasting apparatus includes a chaff collector for securing to the housing and having an opening for alignment with the drum opening. The chaff collector permits dispensing of the beans out of the roasting apparatus while secured to the housing, and, in practicing the method of roasting beans described above, ejection of the beans occurs while the chaff collector is secured to the housing.

Preferably, the roasting apparatus includes a drum which is removable from the housing for loading and cleaning and replaceable within the housing for roasting the beans, and the drum is supported for rotation about a substantially horizontal axis. The drum may also include a first set of the vanes at a first angle to the drum axis and a second set of vanes at a second angle to the drum axis, different from the first angle.

In another aspect, the present invention provides a roasting apparatus for coffee beans and other food comprising a housing, a heater on the housing capable of heating the beans to a temperature sufficient to roast the beans and a perforated drum on the housing rotatable about a substantially horizontal axis and having an opening therein for receiving beans to be roasted, retaining the beans as the beans are heated and ejecting the beans at the completion of roasting. A plurality of vanes within the drum are provided to impart movement to the beans as the drum is rotated, wherein the vanes are arranged such that as the drum is rotated about the axis the beans are stirred and retained by the vanes within the drum. A fan on the housing is capable of flowing cooling ambient air through an opening in the drum axially along the drum horizontal axis and out of the drum opening for removing chaff generated by roasting of the beans. A collector is secured to the housing which is capable of collecting chaff removed through the drum opening.

Preferably, chaff collector includes means for securing the collector to the housing and has an opening for alignment with the drum opening, such that the chaff collector may permit dispensing of the beans out of the roasting apparatus while secured to the housing.

In a further aspect, the present invention provides a roasting apparatus for coffee beans and other food comprising a housing, a heater on the housing capable of heating the beans to a temperature sufficient to roast the beans and a drum on the housing rotatable about a substantially horizontal axis and having an opening therein for receiving beans to be roasted, retaining the beans as the beans are heated and dispensing the beans at the completion of roasting. Drive means is provided on the housing for supporting and rotating the drum, the drum being removable from and replaceable on the drive means by vertical movement of the drum with respect to the drive means. A removable cover is over the housing and drum. When closed, the cover substantially restricts access by a user to the drum, except for the drum opening, and, when opened, the cover permits removal of the drum from the roasting apparatus for filling or cleaning of the drum. The roasting apparatus may include a safety interlock which, when activated, prevents opening of the cover when the drum is at bean roasting temperature and which automatically deactivates upon cooling of the drum to permit opening of the cover to remove the drum. This aspect of the invention may also include a chaff collector secured to the drum opening which has a lip which is captured by the cover when the cover is in the closed position. The chaff collector is then non-removable from the roasting apparatus housing when the cover is in the closed position.

In yet another aspect, the present invention is directed to a roasting apparatus for coffee beans and other food comprising a housing, a heater on the housing capable of heating the beans to a temperature sufficient to roast the beans and a drum on the housing rotatable about an axis and having an opening therein for receiving beans to be roasted, retaining the beans as the beans are heated and dispensing the beans at the completion of roasting. The roaster includes a fan on the housing capable of flowing cooling ambient air through the drum and out of the drum opening for removing chaff generated by roasting of the beans, and a collector secured to the housing capable of collecting chaff removed through the drum opening. The chaff collector has an opening for alignment with the drum opening, the opening including one passage for the chaff to a chaff collection portion and another passage for dispensing the beans after roasting from the drum opening and out of the roasting apparatus. The chaff collector opening further includes a baffle for deflecting chaff into the chaff collection portion while permitting dispensing of the beans out of the roasting apparatus. In its preferred embodiment, the drum is removable from the housing for loading and cleaning and replaceable within the housing for roasting the beans and is supported for rotation about a substantially horizontal axis. Preferably, the roasting apparatus further includes a hinged, removable cover on the housing for permitting access to the drum and the chaff collector includes a lip which may be captured by the cover when the cover is in the closed position, so that the chaff collector is non-removable from the roasting apparatus housing when the cover is in the closed position.

In a further aspect, the present invention is directed to a roasting apparatus for coffee beans and other food comprising a housing, a heater on the housing capable of heating the beans to a temperature sufficient to roast the beans, a drum on the housing rotatable about an axis and having an opening therein for receiving beans to be roasted, retaining the beans as the beans are heated and dispensing the beans at the completion of roasting and drive means on the housing for supporting and rotating the drum. A removable cover is over the housing and drum which, when closed, substantially restricts access by a user to the drum, except for the drum opening, and which, when opened, permits removal of the drum from the roasting apparatus for filling or cleaning of the drum. A safety interlock is provided which, when activated, prevents opening of the cover when the drum is at bean roasting temperature and which automatically deactivates upon cooling of the drum to permit opening of the cover to remove the drum. The roasting apparatus may further include a chaff collector secured to the drum opening which has a lip which is captured by the cover when the cover is in the closed position so that the chaff collector is non-removable from the roasting apparatus housing when the cover is in the closed position.

In another aspect, the present invention provides a roasting apparatus for coffee beans and other food comprising a housing, a heater on the housing capable of heating the beans to a temperature sufficient to roast the beans, a drum on the housing rotatable about an axis and having an opening therein for receiving beans to be roasted and retaining the beans as the beans are heated, and drive means on the housing for supporting and rotating the drum. A removable cover is present over the housing and drum which, when in the closed position, substantially restricts access by a user to the drum, except for the drum opening, and which, when in the open position, permits user access to the drum. A collector may be secured to the housing which is capable of collecting chaff removed through the drum opening. The chaff collector has an opening for alignment with the drum opening, and is non-removable from the roasting apparatus housing when the cover is in the closed position. The roasting apparatus further includes a safety interlock which, when activated, prevents opening of the cover when the drum is at bean roasting temperature and which automatically deactivates upon cooling of the drum to permit opening of the cover to remove the drum. In its preferred embodiment, the chaff collector includes a lip which is captured by the cover when the cover is in the closed position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2B is an exploded perspective view of the preferred chaff collector employed in the present invention.

DESCRIPTION OF THE PREFERRED EMBODIMENT(S)

In describing the preferred embodiment of the present invention, reference will be made herein to FIGS. 1–10 of the drawings in which like numerals refer to like features of the invention. Features of the invention are not necessarily shown to scale in the drawings. While the present invention is preferably a coffee bean roaster, and is described as such, it is to be understood that it is not limited to such use, and may be used to roast other types of beans, nuts and other food items.

Figure 1:
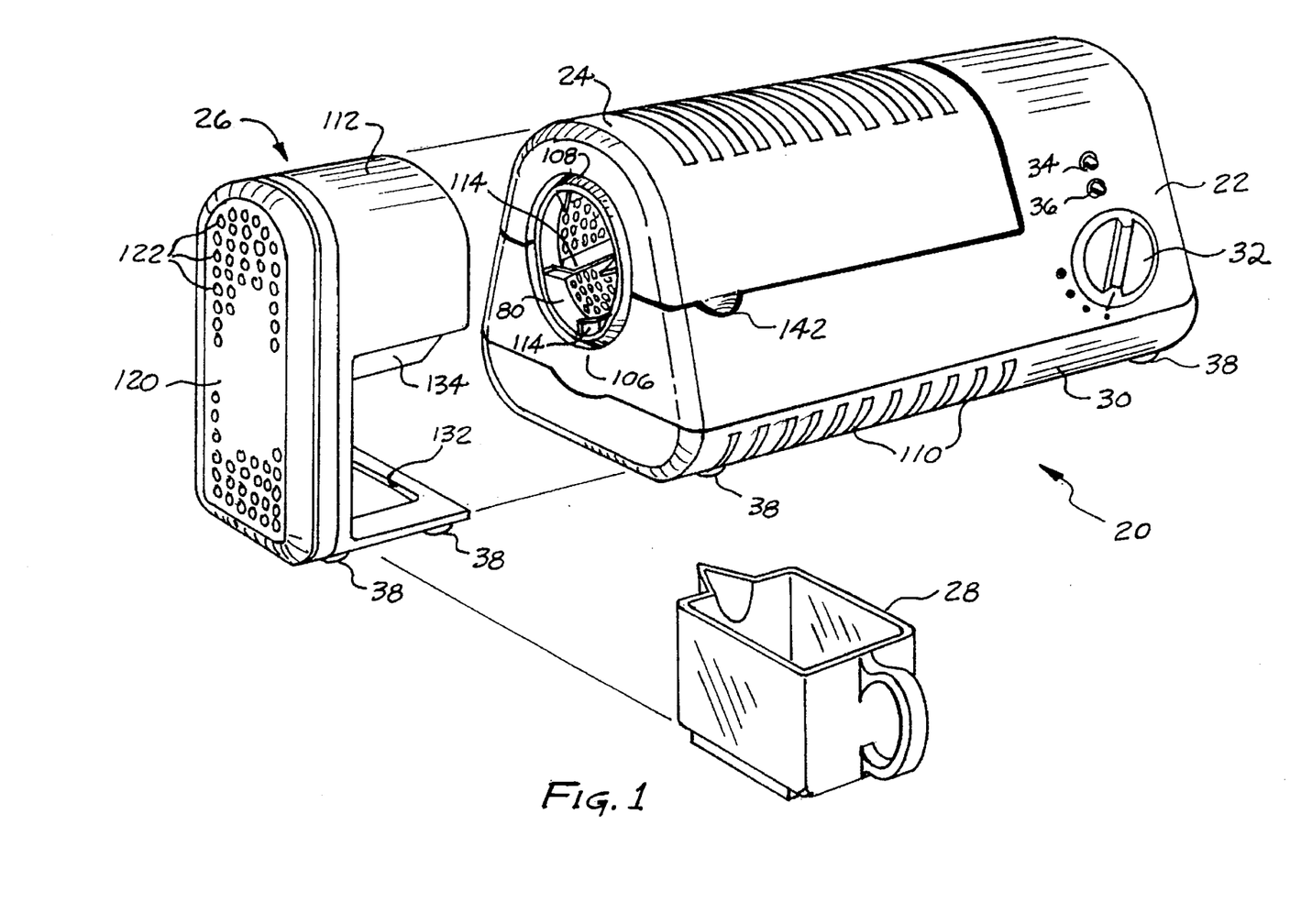
FIG. 1 is a perspective view of the preferred roasting apparatus for coffee beans and other food of the present invention, including the roasting portion, the chaff collector portion and the dispensing cup.

The preferred coffee bean roaster apparatus 20 of the present invention is depicted in FIG. 1. Coffee roaster portion 20 comprises an elongated base section 30 on which is mounted the main housing 22 having hinged, openable cover portion 24. A relief portion 142 is provided in housing 22 for fingertip access to open cover 24. Base 30 contains air slots 110 which contribute to air flow through the device during the heating and cooling cycles, as will be explained further below. Housing 22 and cover 24 on one end form drum openings 106, 108, respectively, which form a circular opening for the end portion 80 of the roasting drum. Interior vanes or baffles 114 are contained within the roasting drum for stirring and moving the beans during roasting and dispensing. A control dial 32 is provided to turn the device on and select the length of time for the roasting operation, after which the cooling cycle and dispensing process are automatically set. Indicator light 34 indicates when the heating element is on and the coffee beans are roasting and indicator light 36 indicates when the beans are cooling and/or ready for dispensing.

Figure 2:
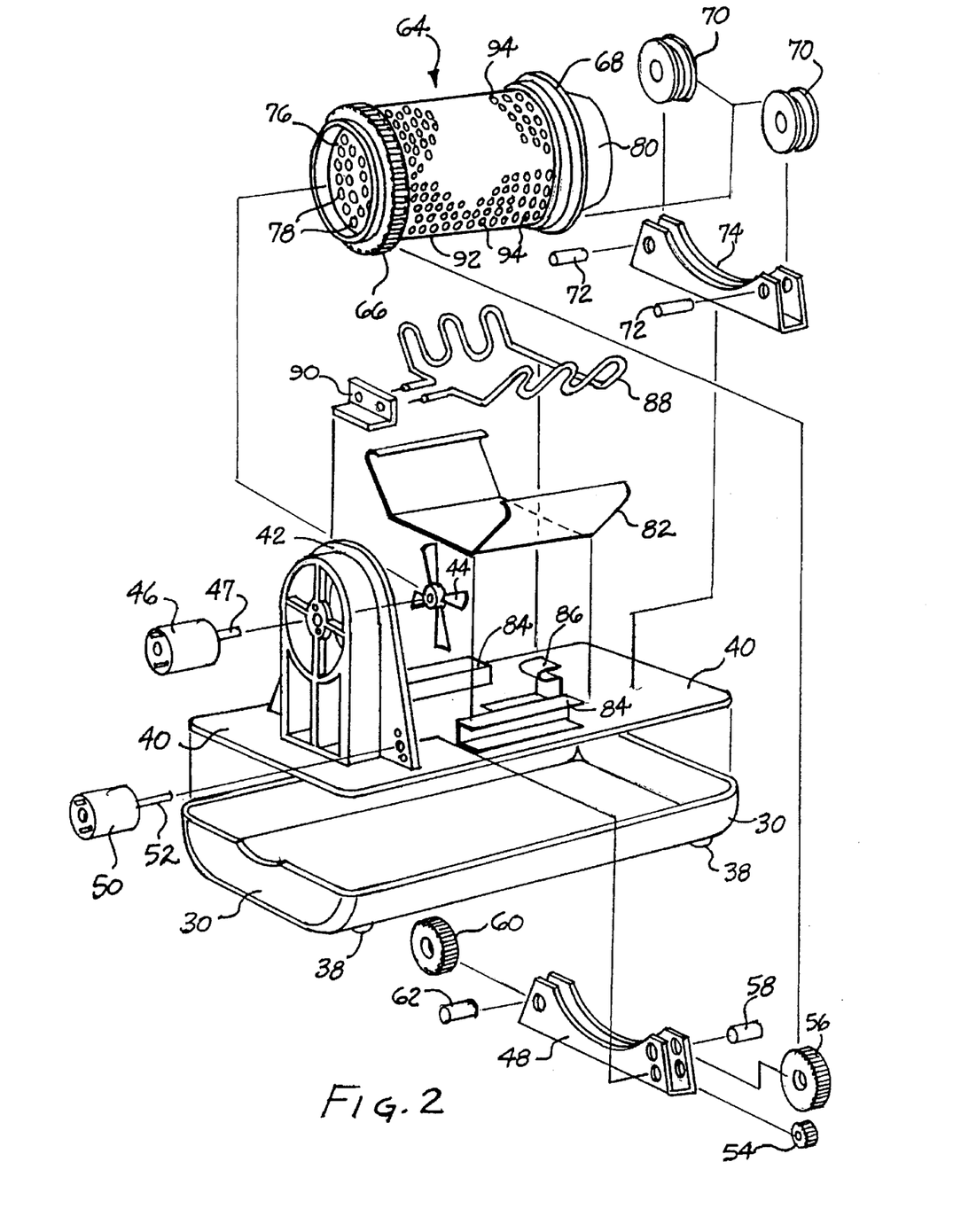
FIG. 2 is an exploded perspective view of the preferred base and internal portions of the roasting apparatus portion of the present invention.
Figure 2A:
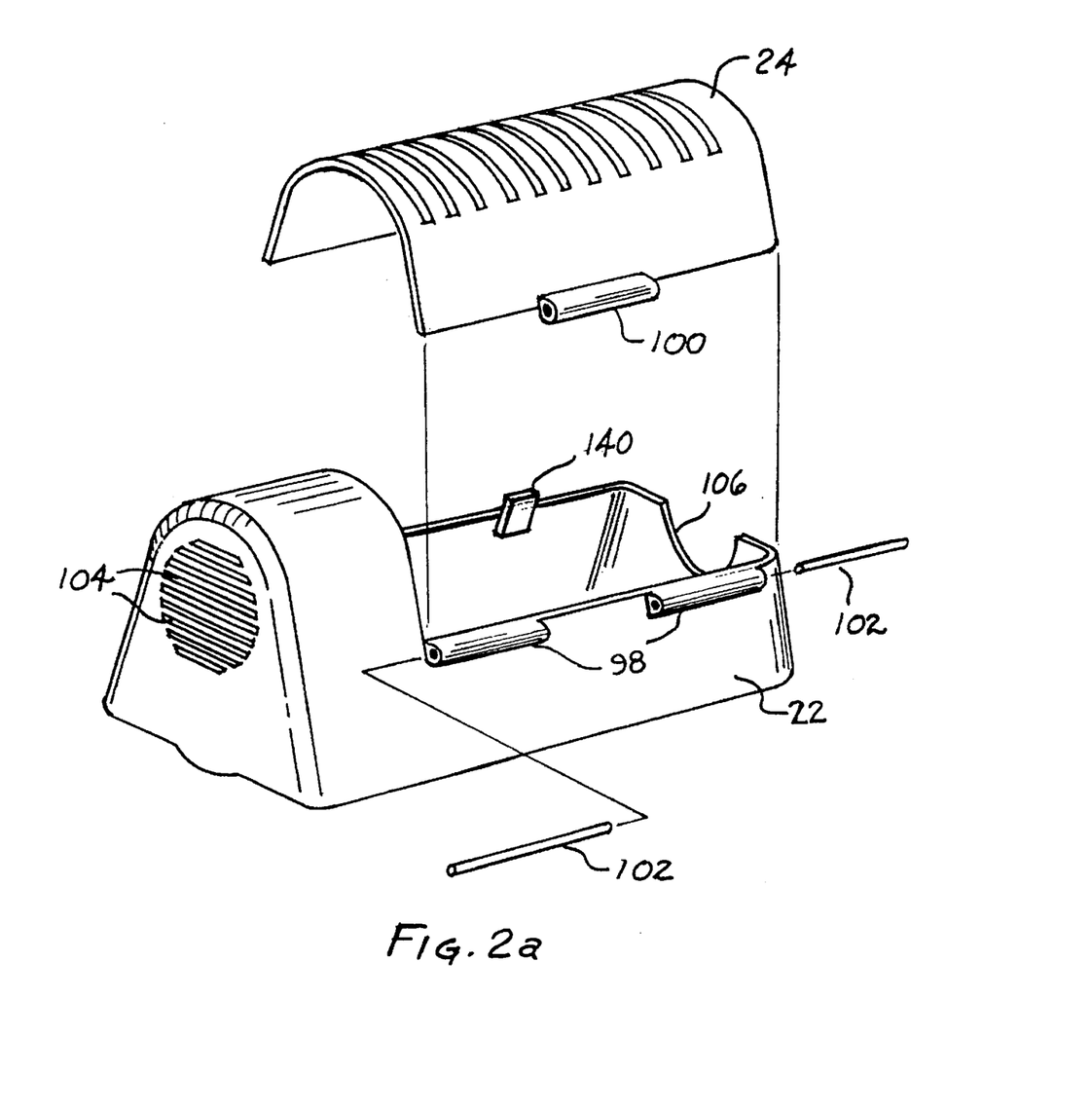
FIG. 2A is an exploded perspective view of the preferred top housing and cover portion of the roasting apparatus portion of the present invention.

As seen in FIG. 2A, coffee roaster housing 22 and cover 24 have complimentary hinge elements 98, 100, respectively, which are movably secured by hinge pin 102. Ventilation slot openings 104 are provided at the end of housing 22, opposite the drum opening 106, to provide a source of the air during the cooling phase of the roasting operation.

A combination chaff collector and dispenser cup holder 26 is shown for engagement with the drum opening of coffee roaster 20. Chaff collector 26 includes a perforated end cover 120 which contains a plurality of openings 122 which are sized sufficiently large to permit air to easily flow through the cover but small enough to catch substantially all of the chaff and not permit it to be blown back out of the device. A notched section 132 in the lower portion of chaff collector 26 is sized to securely receive the base of removable cup 28 into which the coffee beans may be dispensed after roasting. Rubber feet 38 are provided on the lower surface of coffee roaster base 30 and chaff collector 26 to prevent the device from sliding on a surface, for example, a kitchen counter. The housing, cover, base, cup and chaff collector are preferably made of plastic.

Figure 7:
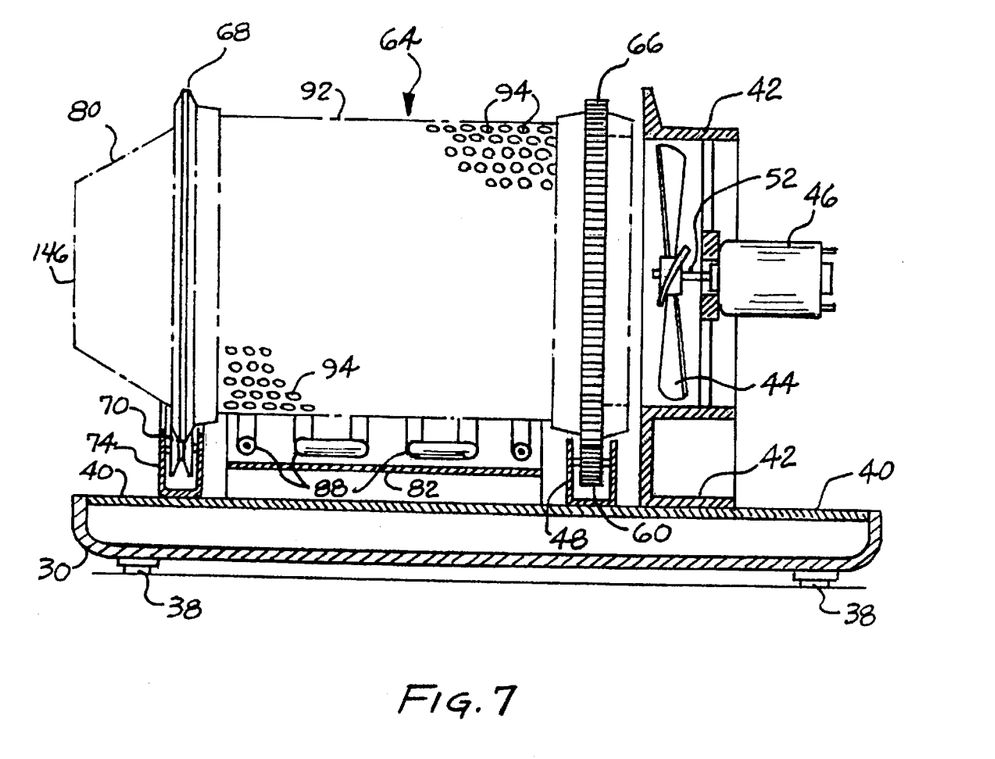
FIG. 7 is a sectional elevational view, along the longitudinal axis, of the drum and fan mounted on the base of the preferred roasting apparatus portion of the present invention.

Turning to FIGS. 2 and 7, the interior components of coffee roaster portion 20 may be seen in more detail. An interior frame 40 is provided for attachment within base 30. Fan housing 42 sits upright on frame 40 at one end of the base and receives output shaft 47 of electric motor 46. On the motor output shaft is mounted axial flow fan 44 for receiving ambient air from housing air slots 104 (FIG. 2A) and forcing the air through perforations or openings 78 in the base of drum 64. For supporting and driving drum 64 there is provided first drum drive wheel frame 48 adjacent fan housing 42 on frame 40. Output shaft 52 of electric drive motor 50 extends through an opening in fan housing 42 and drive wheel frame 48 where it is mated with drive motor pinion gear 54. A drum drive gear 56, rotatably mounted on gear shaft 58, engages with and is driven by pinion gear 54. On the opposite end of drive wheel frame 48 is mounted drum idler gear 60 of similar size and tooth configuration to drive gear 56, and which is rotatably mounted on gear shaft 62. On the opposite end of base frame 40 there is provided drum guide wheel frame 74 on whose opposite sides are mounted identical drum guide wheels 70 on shafts 72.

To hold the coffee beans during roasting operation, there is provided cylindrical, perforated roasting drum 64 having on one end ring gear 66 and on the opposite end circumferential ring runner 68. Drum 64 is preferably made of a heat and corrosion resistant metal such as stainless steel, and preferably has a capacity sufficient to hold from about 0.5 lbs. (225 g) to 5 lbs. (2.25 kg) of coffee beans or other food items to be roasted. Ring gear 66 is of size and gear configuration to mate with and be supported by gears 56 and 60 on drive wheel frame 48 (FIG. 4), while ring runner 68 is of size and configuration to be received and supported by guide wheels 70 on guide wheel frame 74 (FIG. 7). The speed of motor 50 and gearing size and ratios are selected so that, in normal operation, drive motor 50 turns drum 64 in one direction during the roasting operation at approximately 14 rpm. Motor 50 is reversible to drive drum 64 in the opposite direction to eject the beans after roasting, as will be explained further below.

A serpentine electrical resistance heating element 88, known as a "Cal-Rod", is provided to heat the coffee beans sufficiently to roast them. Heating element 88 has end portions 88a and 88b (FIG. 6) which are held by mounting bracket 90 for connection to the electrical supply of the coffee roaster (not shown). The other end of heating unit 88 is supported by bracket 86 which is mounted on frame 40. To shield the base of the coffee roaster from damage from heating element 88, there is provided a heat deflector shield 82 which is mounted on brackets 84 on base 40. Heat shield 82, preferably made of stainless steel sheet, wraps around the bottom and sides of the heating unit (FIG. 5) so that the heat from element 88 does not damage the base of the unit. Heating element 88 typically has 1000 watts thermal output, sufficient to heat the beans within the drum to a temperature of between 350° and 500° F.

Figure 3:
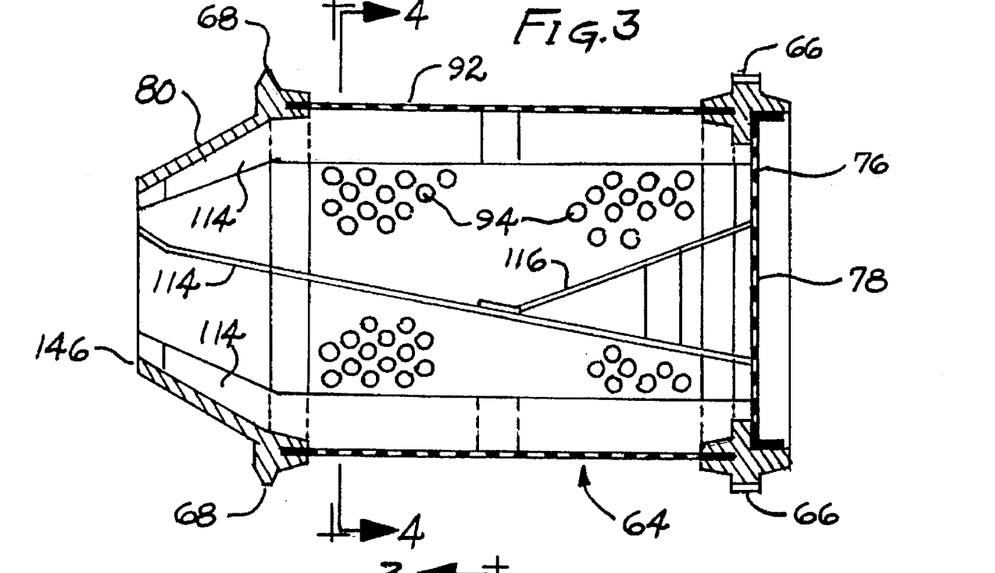
FIG. 3 is a cross-sectional view, along the longitudinal axis, of the roasting drum employed in the preferred roasting apparatus portion of the present invention.
Figure 4:
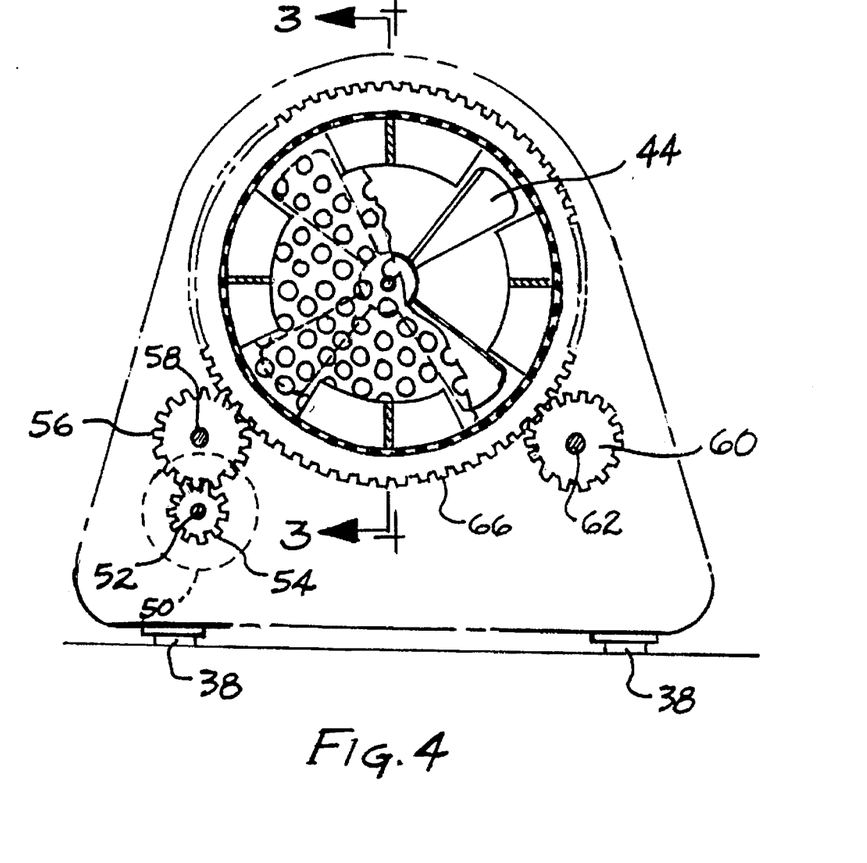
FIG. 4 is a sectional elevational view of the preferred roasting apparatus portion of the present invention showing the rotatable drum and drive mechanism along line 4—4 of FIG. 3.
Figure 5:
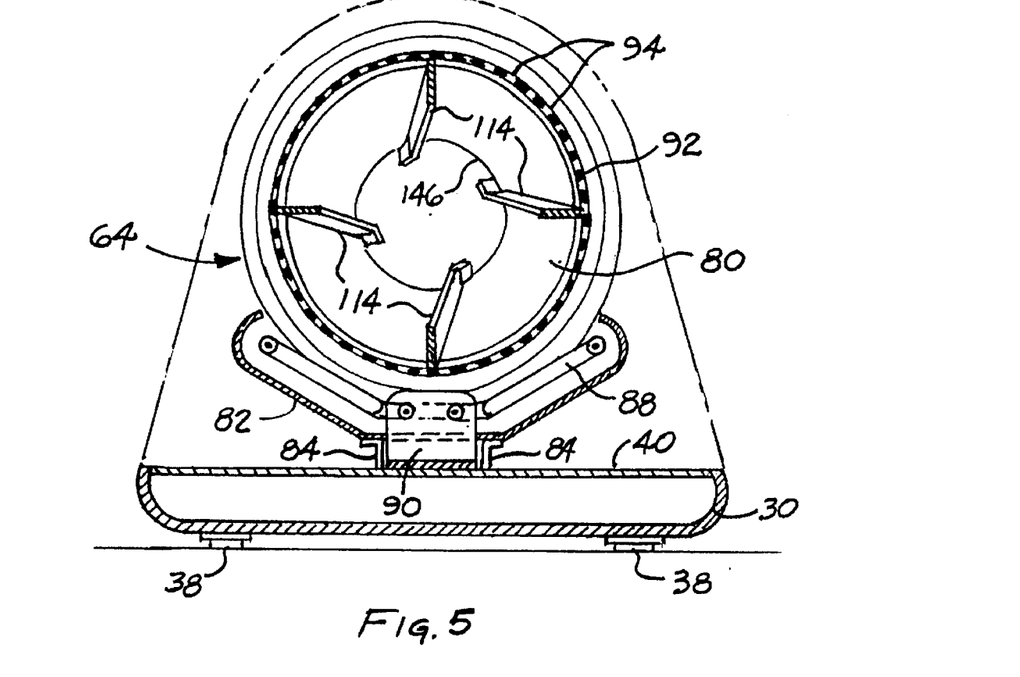
FIG. 5 is a sectional elevational view, along a radius of the longitudinal axis, of the preferred roasting apparatus showing the rotating drum and internal vanes and heating element.
Figure 6:
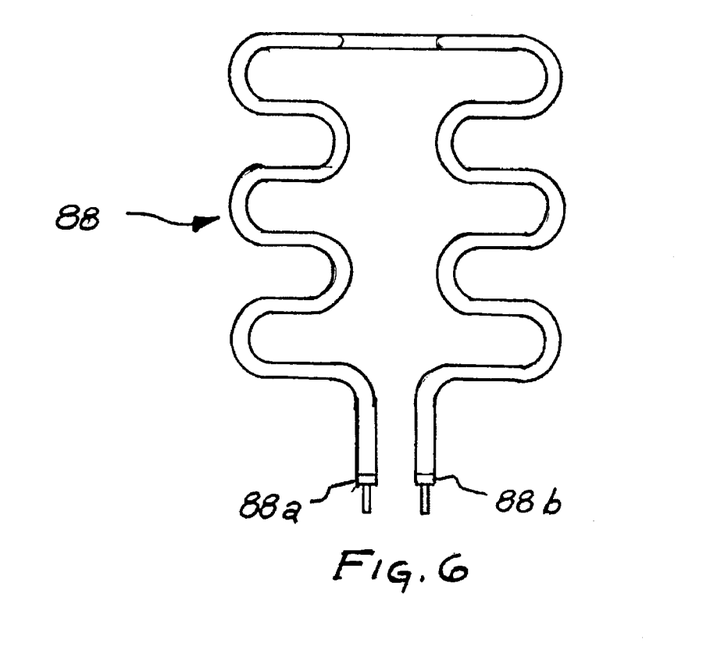
FIG. 6 is a plan view of the heating element depicted in FIG. 5.

As shown in more detail in FIGS. 3, 4 and 5, drum 64 has cylindrical side wall 92 which contains a plurality of perforations or openings 94 which are sufficiently large to enable heated air from heating element 88 to pass through the drum, but sufficiently small so that the coffee beans do not fall out of the drum. An end plate 76 closes one end of the drum and contains opening 78 which are again sufficiently large to permit passage of air therethrough but not so large as to permit coffee beans of normal size to fall out. The drum end opposite end 76 contains opening 146, within inwardly tapering end flange 80, through which the coffee beans are loaded and ejected.

Figure 10:
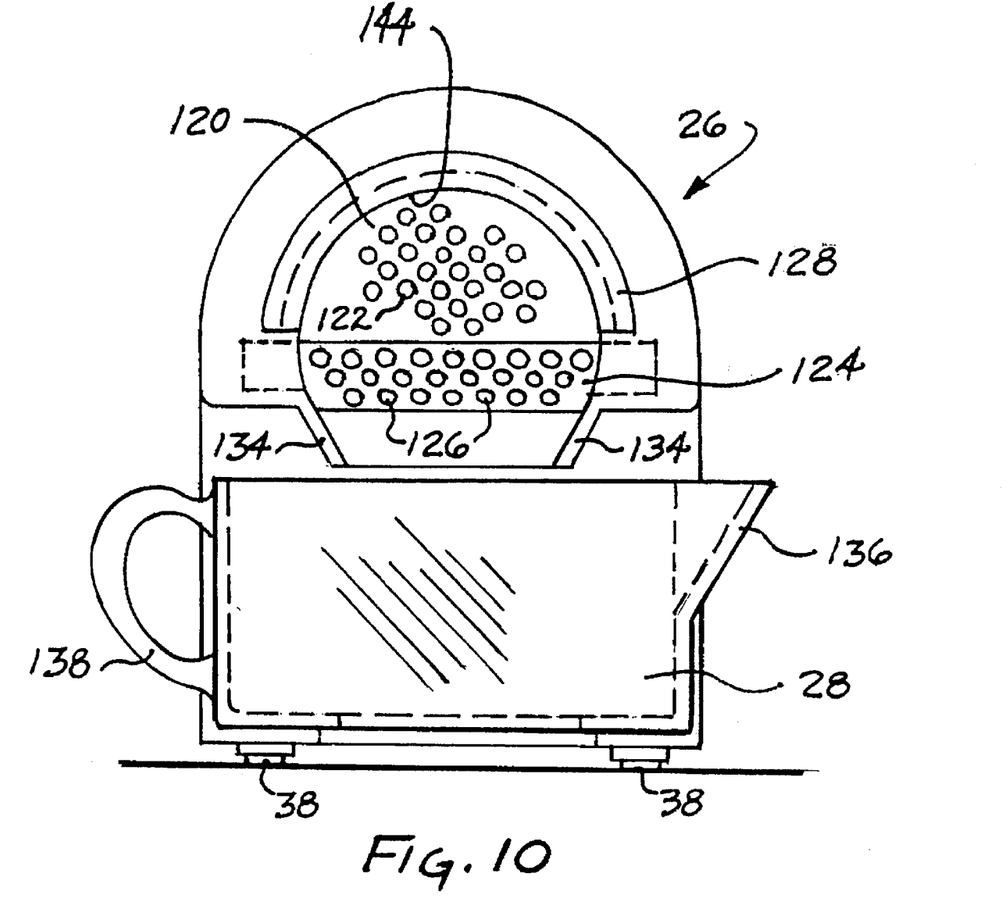
FIG. 10 is an elevational end view of the preferred chaff collector and dispensing cup shown along line 10—10 of FIG. 9.

The chaff collector portion of the present invention is shown in more detail in FIGS. 2B and 10. At the front end of chaff collector 26 as shown is opening 144 which is defined by a semi-circular lip or flange 128 around the upper portion of the opening and, around the lower portion of the opening, rearwardly sloping deflector plate 130. Mounted in front of deflector plate 130 is chaff collector screen 124 containing a plurality of perforations or openings 126 which permit passage of air. Both deflector plate 130 and chaff collector screen 124 act as baffles to the flow of chaff-containing air and to the flow of roasted coffee beans being dispensed. The main collector housing portion 112 has an open back which receives the chaff collector cover 120 mounted along its edges in the chaff collector cover holder 118. Optionally, cover holder 118 may be provided as an elongated flexible hose, with or without cover 120 at the end opposite collector housing 112, to transfer the chaff to a collection area away from the roasting apparatus.

As assembled to the coffee roaster, the flange 128 of chaff collection 126 mates with drum opening 108 of cover 24 when the latter is in the closed position. This mating interlock feature prevents the chaff collector from being removed during operation of the coffee roaster and limits access of the user's fingers to the hot drum. Below chaff collector front opening 144, there are provided a pair of facing inwardly sloping guide plates 134 for guiding the coffee beans into the collection cup 28 when it is secured within the chaff collector.

During operation of the coffee roaster, the cover of the roasting apparatus 20 is configured to be opened and drum 64 removed and placed upright with end portion 76 down and flange 80 up so the coffee beans can be loaded into the drum. The drum 74 may then be placed back inside the coffee roaster apparatus 20 such that the ring gear 66 engages the gears 56, 60 and ring runner 68 engages guide wheels 70. Upon activation, heating element 88 is adapted to heat the drum and the surrounding air which rises upward into the drum through perforation openings 94 to roast the beans. At the same time, motor 50 is adapted to cause drum 64 to rotate in one direction by means of the intermediate gearing 52, 66 to heat the beans evenly.

In order to stir the beans during roasting, there are provided in the preferred embodiment four internal helical vanes or baffles 114, which are secured to the interior of the drum 64 and extend radially inward for a portion of the radius. The number of vanes may vary, depending on the capacity and size of the drum and the type of food item to be roasted As shown most clearly in the side view of FIG. 3, vanes 114 extend longitudinally at an angle of, for example, 10° to the longitudinal axis of the drum such that, when the drum is rotated in one direction, the beans tend to be forced back toward end 76 of the drum and away from mouth opening 146. To provide additional stirring action, there may optionally be provided an additional, oppositely angled set of radially extending inward vanes 116 which intersect with vanes 114 at an angle of, for example, −20° to the longitudinal axis of the drum, at about the mid-portion of the drum.

After the beans have been held at a sufficiently high temperature for a time sufficient to roast them thoroughly, heating element 88 is able to be deactivated and cooling fan 44 turned on so as to cause a flow of ambient, cooling air through perforation 78 and end portion 76 of drum 64. Normally, motor 50 will continue to rotate drum 64 in the same direction as during roasting so that the frangible coating on the now-roasted bean breaks off during the tumbling action imparted by the drum and the loose chaff can then be blown out through drum opening 146.

Figure 8:
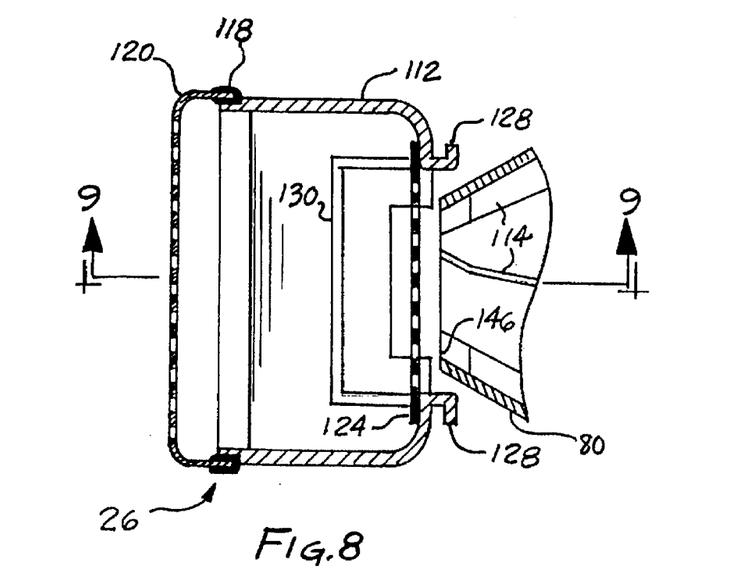
FIG. 8 is a sectional plan view of the preferred chaff collector and mating end portion of the rotating drum of the present invention.
Figure 9:
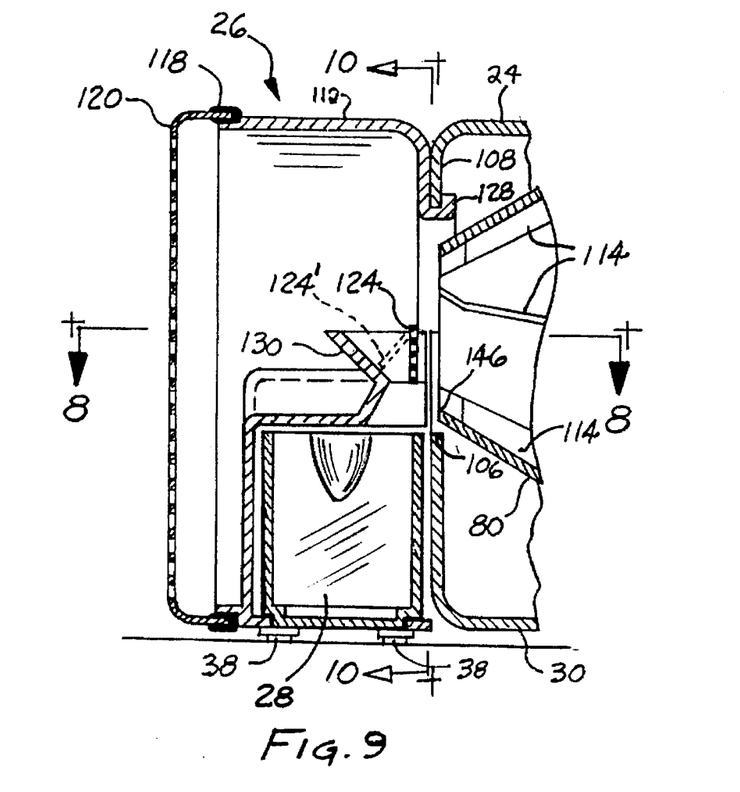
FIG. 9 is a sectional elevational view of the preferred chaff collector and mating end portion of the rotating drum of the present invention along line 9—9 of FIG. 8.

As seen more clearly in FIGS. 8 and 9, chaff collector 26 is configured so that the air stream from fan 44 carrying the bean chaff is deflected upward by chaff collector screen 124 and deflector plate 130 so that it flows into the chaff collector 26 and not down into collection cup 28. The inward taper of flange mouth 80 on drum 64 also contributes to the proper flow of the chaff-containing air stream. The air flow which contained the chaff is directed out through openings 122 in chaff collector cover 120 and the chaff particles fall downward to the lower portion of cover 120 where they are collected and held until removed.

During the time that the drum and other interior portions of the coffee roaster 20 are heated to elevated temperatures, it is important to note that there is provided a heat sensitive switch 140 (FIG. 2A) which engages cover 24 and serves as a safety interlock for the cover. While the interior portion is at a temperature in excess of approximately 350° F. (175° C.), switch 140 locks with cover 24 to prevent the user from opening the cover and gaining access to hot drum 64 to prevent burning of the user's fingers. Likewise, the interlock flange 128 is held within cover opening 108 so that the chaff collector 26 blocks the user from gaining access to the open end 146 of the drum. Only when the interior of coffee roaster 20 cools sufficiently does interlock switch 140 release and enable the cover to be opened so that the drum can be accessed and chaff collector 26 removed.

The present invention also provides for automatic dispensing of roasted coffee beans even before the unit is cooled and the chaff collector is removed. Turning back to FIGS. 3 and 5, vanes 114 are angled with respect to the longitudinal axis sufficiently so that, upon reversal of motor 50 and direction of rotation of drum 64, the vanes cause the roasted coffee beans inside the drum to be pushed toward drum opening 146 and to be ejected into collection cup 28. This may be accomplished automatically or by separate engagement of a control switch which may be activated after roasting is completed. As seen in FIG. 9, chaff collector screen 124 is pivoted at the top so that, when the beans are being dispensed out of drum opening 146, the bottom portion of chaff collector screen 124' swings back away from the opening to permit the beans to fall downwardly. Guide plates 134 and deflector plate 130 guide the beans down into the open top of collection cup 28. Cup 28 may then be grasped by the user by means of handle 138 and the beans may be dispensed through pouring spout 136. Thus, the configuration of the chaff collector 26 permits the chaff to be blown off, collected and held within chaff collector 26, without it being removed from engagement with coffee roaster 22, while still permitting dispensing and removal of the roasted beans into cup 28.

In operation of the present invention, cover 24 is first swung upward by the user and drum 64 is grasped and lifted up and out of housing 22. The green coffee beans are inserted through drum open end 146, after which the drum is reinserted into the housing. Chaff collector 26 is then engaged with the drum opening 106, 108 such that the interlock flange 128 is captured by the lip of cover opening 108. Control knob 32 is then activated to start the roasting process. In the automatic mode, drum rotation is commenced and the heating element heats the beans to a temperature of between about 350° and 500° F. (175° and 260° C.). After approximately 20 minutes, or such other time that is sufficient to roast the beans to the desired degree, the control then deactivates the heating element whereupon the fan is activated and begins to blow lower temperature ambient air through perforated end 76 of drum 64. During this time, the drum continues to rotate and the chaff is blown by the fan through the opening 144 chaff collector 26 where it collects at the lower portion of chaff collector cover 120. After the chaff is substantially blown off the beans, which will be evident by viewing through the chaff collector cover 120, the rotation of drum 64 first stops, and then reverses, thereby causing vanes 114 to move the beans longitudinally toward the drum opening 146 and eject the roasted beans into collection cup 28. Collection cup 28 can be removed once it is filled and the roasted beans can then be ground and used to make coffee. Once the interior of the coffee roaster reaches a sufficiently cool temperature, the interlock cover device is deactivated and the cover 24 may be opened. At this point, the chaff collector 26 may be detached from coffee roaster 22.

In order to clean the unit, the user may open cover 24 and remove drum 64 for cleaning of the interior. Likewise, the user may remove chaff collector cover 122 to discard the chaff collected therein and clean the interior.

Thus, the present invention is seen to provide an improved roasting apparatus for use in the home in which the coffee beans may be easily loaded, roasted and dispensed, which may be easily cleaned, and which prevents the user from accessing excessively hot portions of the device. Additionally, the roasting apparatus chaff collector does not interfere with dispensing of the roasted coffee beans and prevents chaff from escaping the device.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A roasting apparatus for coffee beans and other food comprising:

a housing;

a heater on said housing capable of heating said beans to a temperature sufficient to roast said beans;

a drum on said housing rotatable about an axis and having an opening on an end thereof for receiving beans to be roasted, retaining said beans as said beans are heated and dispensing said beans at the completion of roasting; and a plurality of vanes within said drum for imparting movement to said beans as said drum is rotated, said vanes being arranged such that i) as said drum is rotated in one direction about said axis said beans are stirred and retained by said vanes within said drum, and ii) as said drum is rotated in the opposite direction about said axis said beans are moved by said vanes toward said drum opening for dispensing from said roasting apparatus.

2. The apparatus of claim 1 wherein said drum is removable from said housing for loading and cleaning and replaceable within said housing for roasting said beans.

3. The apparatus of claim 1 wherein said drum is supported for rotation about a substantially horizontal axis.

4. The apparatus of claim 1 including a first set of said vanes at a first angle to said drum axis and a second set of vanes at a second angle to said drum axis, different from said first angle.

5. The apparatus of claim 1 further including a chaff collector for securing to said housing and having an opening for alignment with said drum opening, said chaff collector permitting dispensing of said beans out of said roasting apparatus while secured to said housing.

6. A roasting apparatus for coffee beans comprising:

a housing;

a heater on said housing capable of heating said beans to a temperature sufficient to roast said beans;

a perforated drum on said housing rotatable about a substantially horizontal axis and having an opening therein for receiving beans to be roasted, retaining said beans as said beans are heated and ejecting said beans at the completion of roasting; and a plurality of vanes within said drum for imparting movement to said beans as said drum is rotated, said vanes being arranged such that as said drum is rotated about said axis said beans are stirred and retained by said vanes within said drum;

a fan on said housing capable of flowing cooling ambient air through an opening in said drum axially along said drum horizontal axis and out of said drum opening for removing chaff generated by roasting of said beans; and a collector secured to said housing capable of collecting chaff removed through said drum opening.

7. A roasting apparatus for coffee beans comprising:

a housing;

a heater on said housing capable of heating said beans to a temperature sufficient to roast said beans;

a perforated drum on said housing rotatable about a substantially horizontal axis and having an opening therein for receiving beans to be roasted, retaining said beans as said beans are heated and ejecting said beans at the completion of roasting;

a plurality of vanes within said drum for imparting movement to said beans as said drum is rotated, said vanes being arranged such that as said drum is rotated about said axis said beans are stirred and retained by said vanes within said drum;

a fan on said housing capable of flowing cooling ambient air through an opening in said drum axially along said drum horizontal axis and out of said drum opening for removing chaff generated by roasting of said beans; and a collector secured to said housing capable of collecting chaff removed through said drum opening including a means for securing said collector to said housing and having an opening for alignment with said drum opening, said chaff collector permitting dispensing of said beans out of said roasting apparatus while secured to said housing.

8. A roasting apparatus for coffee beans comprising:

a housing;

a heater on said housing capable of heating said beans to a temperature sufficient to roast said beans;

a drum on said housing rotatable about a substantially horizontal axis and having an opening therein for receiving beans to be roasted, retaining said beans as said beans are heated and dispensing said beans at the completion of roasting;

drive means on said housing for supporting and rotating said drum, said drum being removable from and replaceable on said drive means by vertical movement of said drum with respect to said drive means; and a removable cover over said housing and drum which, when closed, substantially restricts access by a user to said drum, except for said drum opening, and which, when opened, permits removal of said drum from said roasting apparatus for filling or cleaning of said drum.

9. The apparatus of claim 8 further including a safety interlock which, when activated, prevents opening of said cover when said drum is at bean roasting temperature and which automatically deactivates upon cooling of said drum to permit opening of said cover to remove said drum.

10. A roasting apparatus for coffee beans comprising:
a housing;
a heater on said housing capable of heating said beans to a temperature sufficient to roast said beans;
a drum on said housing rotatable about a substantially horizontal axis and having an opening therein for receiving beans to be roasted, retaining said beans as said beans are heated and dispensing said beans at the completion of roasting;
drive means on said housing for supporting and rotating said drum said drum, being removable from and replaceable on said drive means by vertical movement of said drum with respect to said drive means;
a removable cover over said housing and drum which, when closed substantially restricts access by a user to said drum, except for said drum opening, and which, when opened, permits removal of said drum from said roasting apparatus for filling or cleaning of said drum; and
a chaff collector secured to said drum opening which has a lip on said chaff collector which is captured by said cover when said cover is in the closed position, said chaff collector being non-removable from said roasting apparatus housing when said cover is in said closed position.

11. A roasting apparatus for coffee beans comprising:
a housing;
a heater on said housing capable of heating said beans to a temperature sufficient to roast said beans;
a drum on said housing rotatable about an axis and having an opening therein for receiving beans to be roasted, retaining said beans as said beans are heated and dispensing said beans at the completion of roasting; and
a fan on said housing capable of flowing cooling ambient air through said drum and out of said drum opening for removing chaff generated by roasting of said beans; and
a collector secured to said housing capable of collecting chaff removed through said drum opening, the chaff collector having an opening for alignment with said drum opening, said opening including one passage for said chaff to a chaff collection portion and another passage for dispensing said beans after roasting from said drum opening and out of said roasting apparatus, said opening further including a baffle for deflecting chaff into said chaff collection portion while permitting dispensing of said beans out of said roasting apparatus.

12. The apparatus of claim 11 wherein said drum is removable from said housing for loading and cleaning and replaceable within said housing for roasting said beans.

13. The apparatus of claim 11 wherein said drum is supported for rotation about a substantially horizontal axis.

14. A roasting apparatus for coffee beans comprising:
a housing;
a heater on said housing capable of heating said beans to a temperature sufficient to roast said beans;
a drum on said housing rotatable about an axis and having an opening therein for receiving beans to be roasted, retaining said beans as said beans are heated and dispensing said beans at the completion of roasting; and
a fan on said housing capable of flowing cooling ambient air through said drum and out of said drum opening for removing chaff generated by roasting of said beans;
a removable cover on said housing for permitting access to said drum; and
a collector secured to said housing capable of collecting chaff removed through said drum opening, the chaff collector having an opening for alignment with said drum opening, said opening including one passage for said chaff to a chaff collection portion and another passage for dispensing said beans after roasting from said drum opening and out of said roasting apparatus, said opening further including a baffle for deflecting chaff into said chaff collection portion while permitting dispensing of said beans out of said roasting apparatus, wherein the chaff collector has a lip which may be captured by said cover when said cover is in the closed position, said chaff collector being non-removable from said roasting apparatus housing when said cover is in said closed position.

15. The apparatus of claim 11 wherein said cover is mounted on a hinge secured to said housing.

16. A roasting apparatus for coffee beans comprising:
a housing;
a heater on said housing capable of heating said beans to a temperature sufficient to roast said beans;
a drum on said housing rotatable about an axis and having an opening therein for receiving beans to be roasted, retaining said beans as said beans are heated and dispensing said beans at the completion of roasting;
drive means on said housing for supporting and rotating said drum;
a removable cover over said housing and drum which, when closed, substantially restricts access by a user to said drum, except for said drum opening, and which, when opened, permits removal of said drum from said roasting apparatus for filling or cleaning of said drum; and
a safety interlock which, when activated, prevents opening of said cover when said drum is at bean roasting temperature and which automatically deactivates upon cooling of said drum to permit opening of said cover to remove said drum.

17. A roasting apparatus for coffee beans comprising:
a housing;
a heater on said housing capable of heating said beans to a temperature sufficient to roast said beans;
a drum on said housing rotatable about an axis and having an opening therein for receiving beans to be roasted, retaining said beans as said beans are heated and dispensing said beans at the completion of roasting;
drive means on said housing for supporting and rotating said drum;
a removable cover over said housing and drum which, when closed, substantially restricts access by a user to said drum, except for said drum opening, and which, when opened, permits removal of said drum from said roasting apparatus for filling or cleaning of said drum;
a safety interlock which, when activated, prevents opening of said cover when said drum is at bean roasting temperature and which automatically deactivates upon cooling of said drum to permit opening of said cover to remove said drum; and
a chaff collector secured to said drum opening which has a lip on said chaff collector which is captured by said cover when said cover is in the closed position, said chaff collector being non-removable from said roasting apparatus housing when said cover is in said closed position.

18. A roasting apparatus for coffee beans comprising:

a housing;

a heater on said housing capable of heating said beans to a temperature sufficient to roast said beans;

a drum on said housing rotatable about an axis and having an opening therein for receiving beans to be roasted and retaining said beans as said beans are heated;

drive means on said housing for supporting and rotating said drum;

a removable cover over said housing and drum which, when in the closed position, substantially restricts access by a user to said drum, except for said drum opening, and which, when in the open position, permits user access to said drum; and a collector for securing to said housing and capable of collecting chaff removed through said drum opening, the chaff collector having an opening for alignment with said drum opening, said chaff collector being non-removable from said roasting apparatus housing when said cover is in said closed position.

19. The apparatus of claim 18 further including a safety interlock which, when activated, prevents opening of said cover when said drum is at bean roasting temperature and which automatically deactivates upon cooling of said drum to permit opening of said cover to remove said drum.

20. A roasting apparatus for coffee beans comprising:

a housing;

a heater on said housing capable of heating said beans to a temperature sufficient to roast said beans;

a drum on said housing rotatable about an axis and having an opening therein for receiving beans to be roasted and retaining said beans as said beans are heated;

drive means on said housing for supporting and rotating said drum;

a removable cover over said housing and drum which, when in the closed position, substantially restricts access by a user to said drum, except for said drum opening, and which, when in the open position, permits user access to said drum;

a collector for securing to said housing and capable of collecting chaff removed through said drum opening, the chaff collector having an opening for alignment with said drum opening, said chaff collector being non-removable from said roasting apparatus housing when said cover is in said closed position; and a lip on said chaff collector which is captured by said cover when said cover is in the closed position.

* * * * *